(12) United States Patent
Chiang et al.

(10) Patent No.: US 8,456,437 B2
(45) Date of Patent: Jun. 4, 2013

(54) TOUCH PAD MODULE ASSEMBLY STRUCTURE

(75) Inventors: Tsung-Ju Chiang, Taoyuan Shien (TW); Hsiu-Pen Lin, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 701 days.

(21) Appl. No.: 12/720,980

(22) Filed: Mar. 10, 2010

(65) Prior Publication Data

US 2011/0080354 A1   Apr. 7, 2011

(30) Foreign Application Priority Data

Oct. 5, 2009   (TW) ............................... 98218317 U

(51) Int. Cl.
    *G09G 5/00*   (2006.01)
(52) U.S. Cl.
    USPC ................... 345/173; 178/18.03; 361/679.18; 361/679.55
(58) Field of Classification Search
    USPC ..... 345/173; 178/18.03; 200/512; 340/407.1; 361/679.18, 679.55
    See application file for complete search history.

(56) References Cited

U.S. PATENT DOCUMENTS

| 6,118,434 A * | 9/2000 | Nishitani et al. ............... 345/173 |
| 6,239,726 B1 * | 5/2001 | Saida ............................. 340/999 |
| 8,139,347 B2 * | 3/2012 | Chiang et al. ............ 361/679.18 |
| 2007/0205919 A1 * | 9/2007 | Wu ................................. 341/22 |
| 2008/0246741 A1 * | 10/2008 | Hinata .......................... 345/173 |
| 2010/0117969 A1 * | 5/2010 | Shih .............................. 345/173 |
| 2012/0069585 A1 * | 3/2012 | Hirota .......................... 362/382 |

* cited by examiner

*Primary Examiner* — Tom Sheng
(74) *Attorney, Agent, or Firm* — Rabin & Berdo, P.C.

(57) ABSTRACT

A touch pad module assembly structure includes a housing, a touch pad module and a metal bracket. The housing includes a generally rectangular opening. The touch pad module is assembled into the opening. The touch pad module includes a support member and a circuit board. An edge of the support member has a through hole and a pair of resilient members. An opposite edge of the support member has a connection member secured to a surrounding surface of the opening. The circuit board is disposed over the support member and includes a switch aligned with the through hole. The metal bracket is secured to a surrounding edge of the opening to be in to contact with the switch and expose the connection member.

8 Claims, 5 Drawing Sheets

TOUCH PAD MODULE ASSEMBLY STRUCTURE

RELATED APPLICATIONS

This application claims priority to Taiwan Application Ser. No. 98218317, filed Oct. 5, 2009, which is herein incorporated by reference.

BACKGROUND

1. Field of Invention

The present invention relates to a touch pad module. More particularly, the to present invention relates to a touch pad module of a computer device.

2. Description of Related Art

A touch pad module is one of the essential parts of each notebook computer in order to perform a computer mouse's function within an operation system. Because a thinner notebook computer is the mainstream in the market, a thinner touch pad module is needed to meet with this demand. However, it is difficult for a thinner touch pad module to permit a user to sense a clear click feeling. For the forgoing reasons, there is a need for improving the touch pad module assembly structure.

SUMMARY

It is therefore an objective of the present invention to provide an improved touch pad module assembly structure.

In accordance with the foregoing and other objectives of the present invention, a touch pad module assembly structure includes a housing, a touch pad module and a metal bracket. The housing includes a generally rectangular opening. The touch pad module is assembled into the opening. The touch pad module includes a support member and a circuit board. An edge of the support member has a through hole and a pair of resilient members. An opposite edge of the support member has a connection member secured to a surrounding surface of the opening. The circuit board is disposed over the support member and includes a switch aligned with the through hole. The metal bracket is secured to a surrounding edge of the opening to be in contact with the switch and expose the connection member.

According to an embodiment, the switch is disposed between the pair of resilient members.

According to another embodiment, the housing is made from plastic materials.

According to another embodiment, the touch pad module includes a glass panel disposed over the circuit board.

According to another embodiment, the circuit board includes an electrical connector.

According to another embodiment, the support member includes a second through hole exposing the electrical connector.

According to another embodiment, the metal bracket includes a third through hole exposing the electrical connector.

According to another embodiment, the support member is made from plastic materials.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
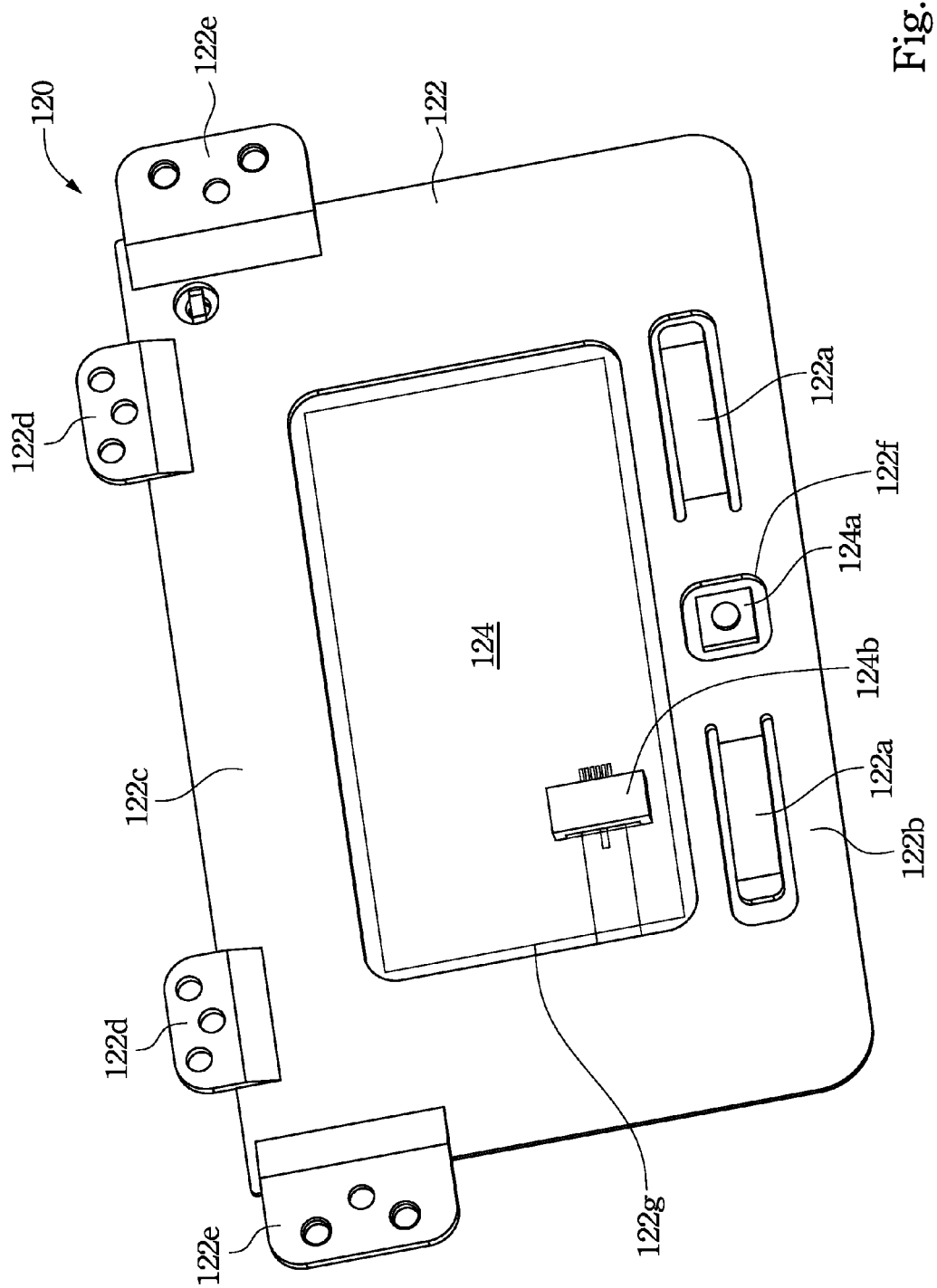
FIG. 1 illustrates a touch pad module according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a touch pad module according to one embodiment of this invention. In this embodiment, a touch pad module 120 includes a support member 122 and a circuit board 124. The circuit board 124 is attached over the plastic support member 122. An edge 122b of the support member 122 has a through hole 122f and a pair of resilient members 122a. Each resilient members 122a has an end secured to the support member 122 and an opposite free end sticking out of the support member 122. An opposite edge 122c of the support member 122 has connection members 122d and connection members 122e to be secured to a computer housing by a screw or bolt. Although both connection members 122d and connection members 122e are illustrated in FIG. 1, either connection members 122d or connection members 122e can be solely designed on the support member 122 according to demand. The circuit board 124 has a touch-control related circuit designed thereon and a switch 124a aligned with a through hole 122f of the support member 122. When the circuit board 124 is attached over the support member 122, the switch 124a is inserted through the through hole 122f and sticks out of the support member 122. The circuit board 124 further includes an electrical connector 124b to be coupled by a signal cable. The support member 122 has a through hole 122g exposing the electrical connector 124b such that the signal cable can be coupled with the electrical connector 124b.

Figure 2:
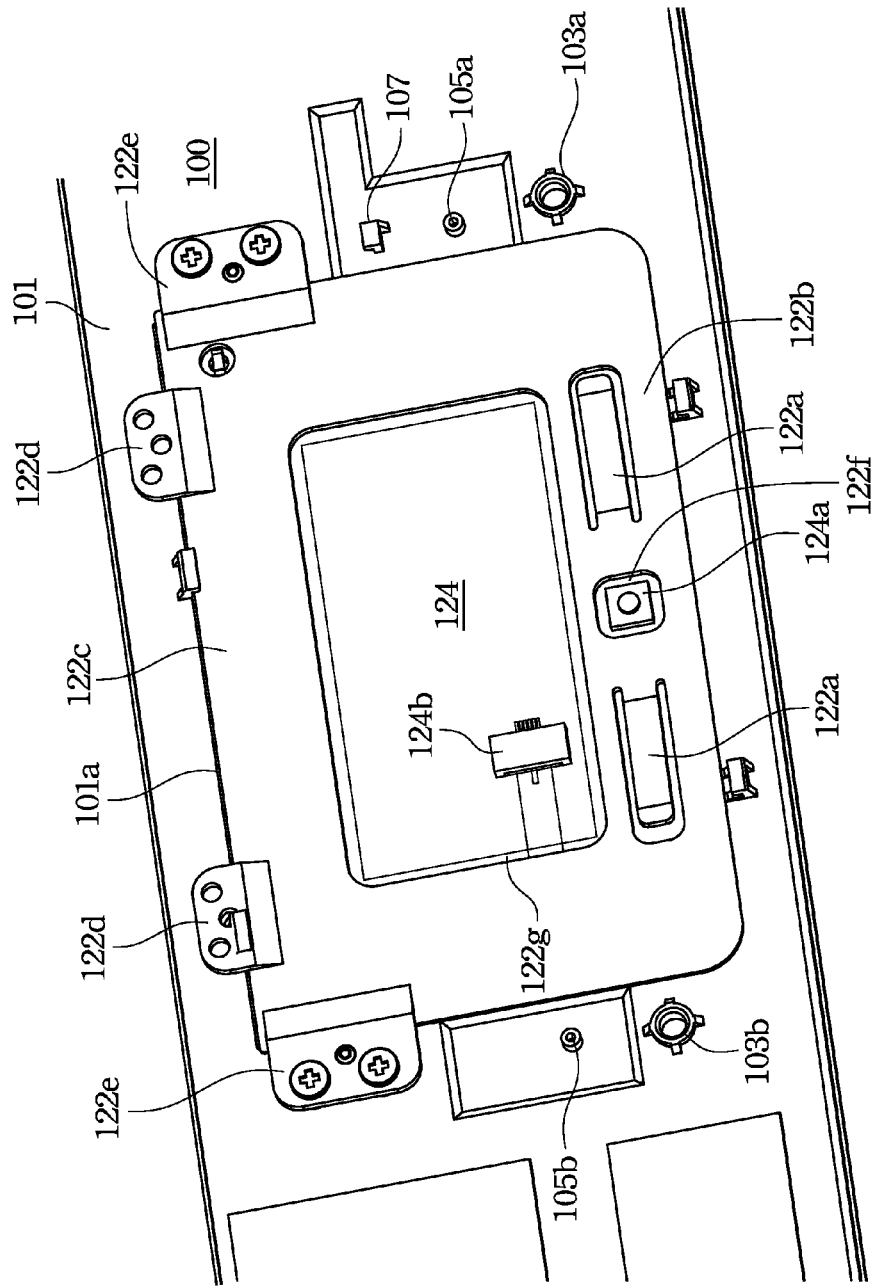
FIG. 2 illustrates the touch pad module in FIG. 1, which is secured to a computer housing.

FIG. 2 illustrates the touch pad module in FIG. 1, which is secured to a computer housing. A computer housing 101 has a generally rectangular opening 101a, to which the touch pad module 120 in FIG. 1 is assembled. In this embodiment, the housing 101 is made from plastic materials. Several fastening structures are designed around the opening 101a, e.g. screw holes (103a, 103b), positioning pins (105a, 105b), a hook member 107 and screw holes corresponding to the connection members (122d, 122e).

Figure 3:
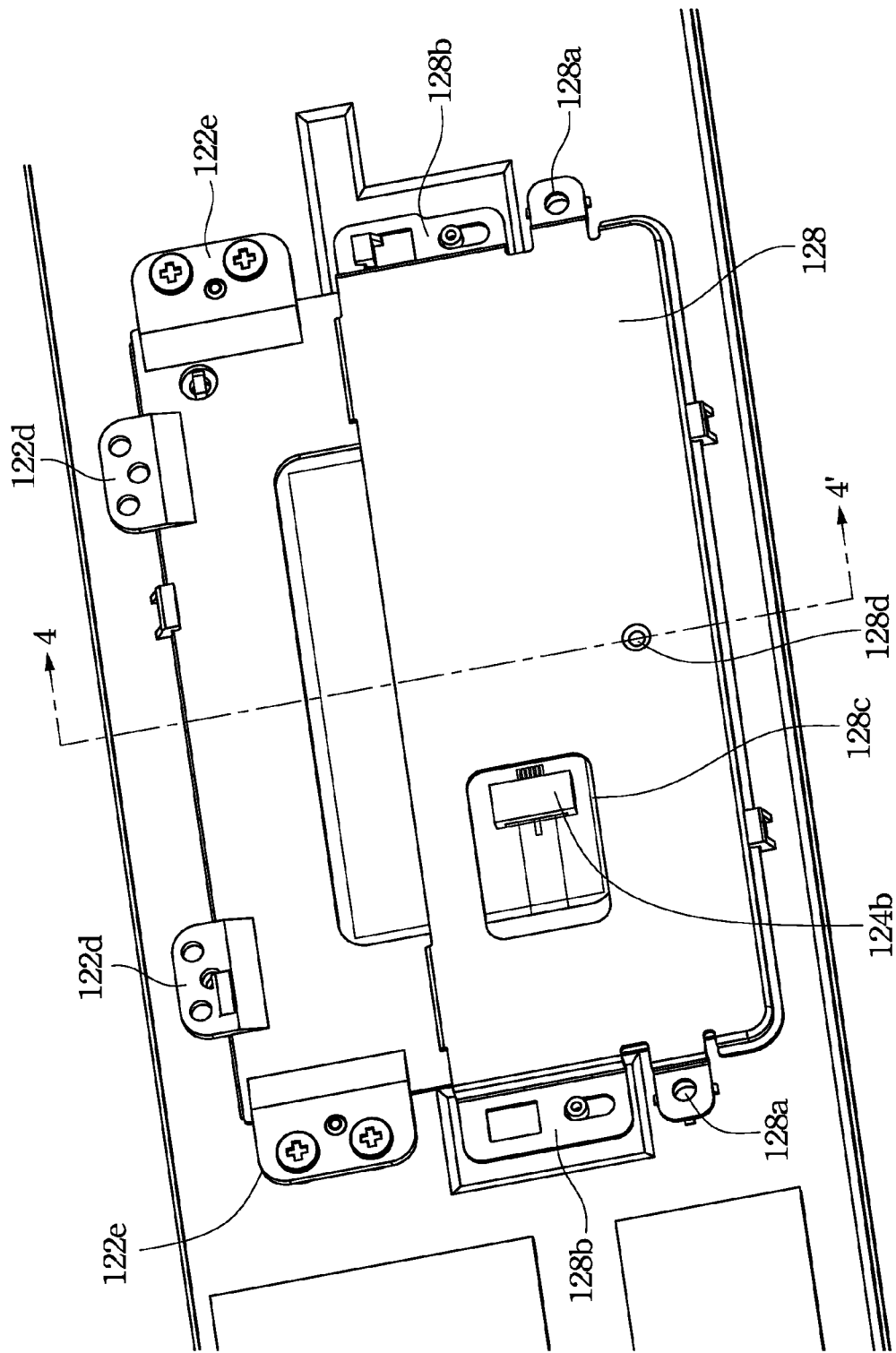
FIG. 3 illustrates a touch pad module assembly structure according to one embodiment of this invention.

FIG. 3 illustrates a touch pad module assembly structure according to one embodiment of this invention. To provide a rigid support for the pair of resilient members 122a and switch 124a, a metal bracket 128 is secured to a surrounding edge of the opening 101a. When the metal bracket 128 is secured to the surrounding edge of the opening 101a, the metal bracket 128 is in contact with the pair of resilient members 122a and switch 124a to provide a rigid support that the pair of resilient members 122a or switch 124a can be pressed. In particular, the metal bracket 128 only covers a half of the support member 122 and exposes another half of the support member 122 (having connection members 122d and connection members 122e). The metal bracket 128 has positioning members (128a, 128b) to be secured to the support member 122. The positioning member 128a is aligned with screw holes (103a, 103b) as illustrated in FIG. 2 and fastened with screws. The positioning member 128b is aligned with the positioning pins (105a, 105b) and hook member 107 as illustrated in FIG. 2.

Figure 4:
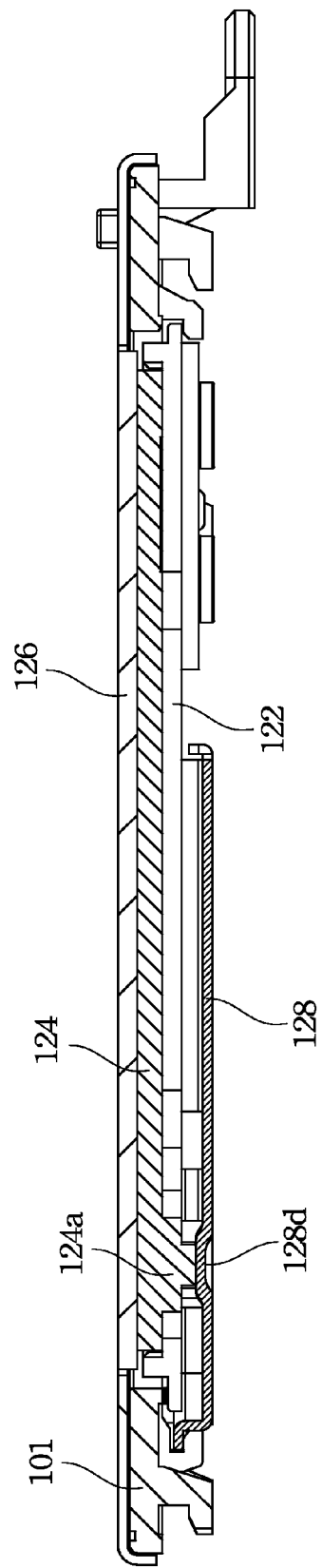
FIG. 4 illustrates a cross-sectional view taken along 4-4' in FIG. 3.

FIG. 4 illustrates a cross-sectional view taken along 4-4' in FIG. 3. From this cross-sectional view, a convex member 128d of the metal bracket 128 is in contact with the switch 124a of the circuit board 124. Besides, the metal bracket 128 is also in contact with the pair of resilient members 122a of the support member 122 (not illustrated in the drawings).

Figure 5:
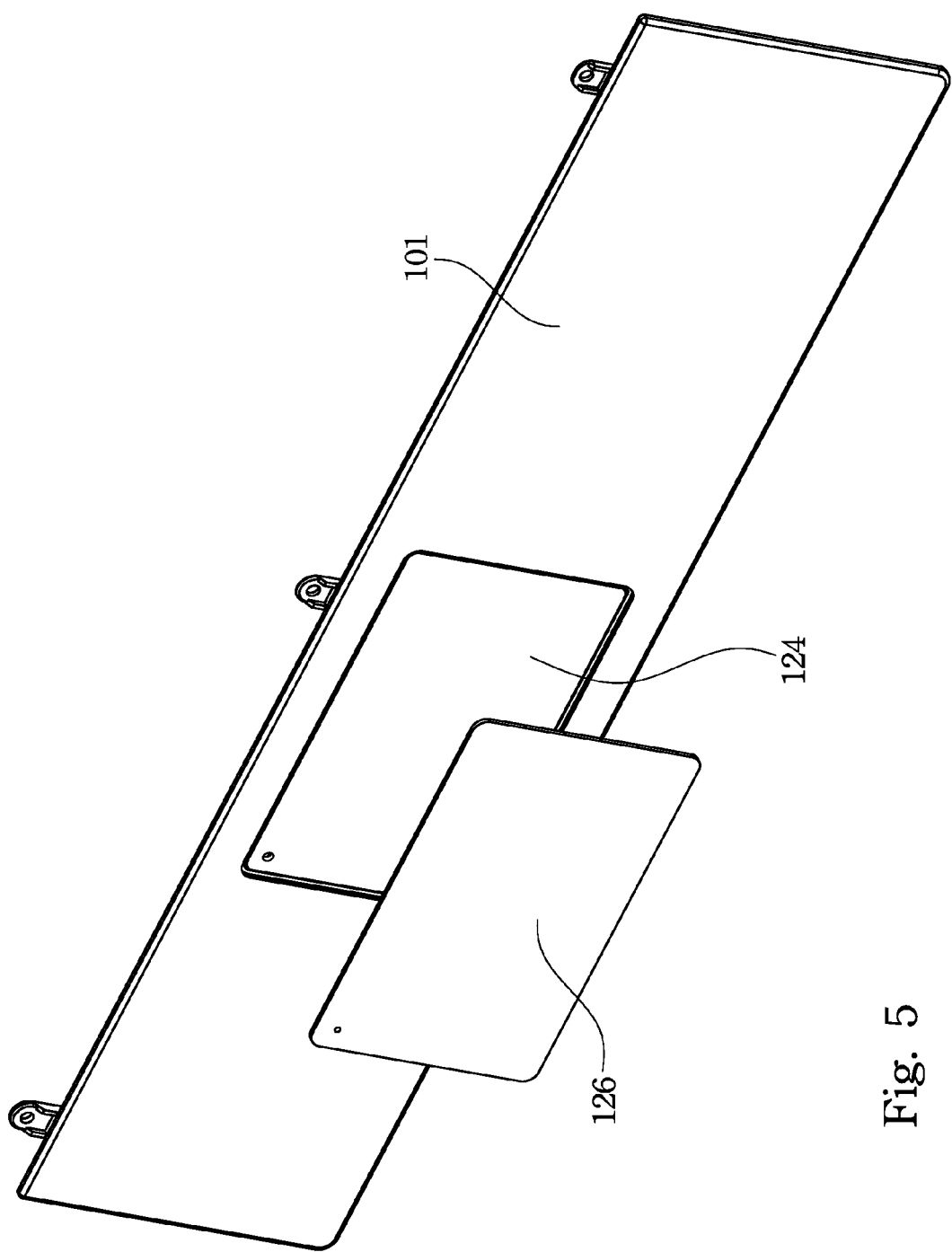
FIG. 5 illustrates a glass panel being assembled to the touch pad module.

Referring both to FIG. 4 and FIG. 5, wherein FIG. 5 illustrates a glass panel being assembled to the touch pad module. A glass panel 126 (also referred as touch panel) is attached to the circuit board 124 from an appearance side of the computer housing 101. This is a final step of the process for assembling the touch pad module to the computer housing 101. The glass panel 126 is left until the last step to precisely control a gap between the glass panel 126 and the housing 101, thereby avoiding interference between the glass panel 126 and the housing 101 when the glass panel 126 is pressed or operated.

According to discussed embodiments, the touch pad module assembly structure herein utilizes positioning pins and screws to position X-Y axis and utilizes screws and hook members to position Z axis. Besides, using screw fastening at left and right sides or at a top side as a pivot point to apply torque balance theory and plastic material characteristics so as to make the touch pad module as a suspending arm such that a touch control and pressing operation can be achieved. The support member has a pair of resilient members to contribute a clear click feeling of touch control and pressing operation. The metal bracket is made of thin plate to support the switch and make the touch pad module even thinner and stronger. The glass panel is left until the last step to precisely control a gap between the glass panel and the housing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch pad module assembly structure comprising:
   a housing comprising a generally rectangular opening;
   a touch pad module being assembled into the opening, the touch pad module comprising:
      a support member, an edge of which has a through hole and a pair of resilient members, an opposite edge of which has a connection member secured to a surrounding surface of the opening; and
      a circuit board disposed over the support member and comprising a switch aligned with the through hole; and
   a metal bracket secured to a surrounding edge of the opening to be in contact with the switch and expose the connection member.

2. The touch pad module assembly structure of claim 1, wherein the switch is disposed between the pair of resilient members.

3. The touch pad module assembly structure of claim 1, wherein the housing is made from plastic materials.

4. The touch pad module assembly structure of claim 1, wherein the touch pad module comprises a glass panel disposed over the circuit board.

5. The touch pad module assembly structure of claim 1, wherein the circuit board comprises an electrical connector.

6. The touch pad module assembly structure of claim 5, wherein the support member comprises a second through hole exposing the electrical connector.

7. The touch pad module assembly structure of claim 6, wherein the metal bracket comprises a third through hole exposing the electrical connector.

8. The touch pad module assembly structure of claim 1, wherein the support member is made from plastic materials.

* * * * *